June 30, 1970    G. L. LOIX    3,517,770
FOLDABLE LADDER

Filed Dec. 16, 1968    7 Sheets-Sheet 1

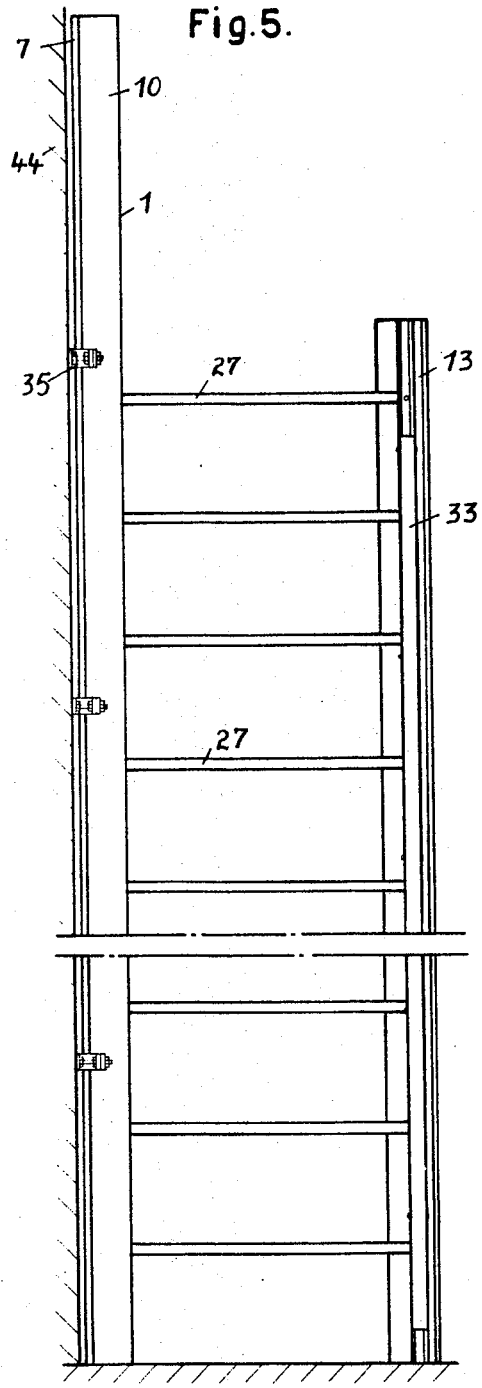
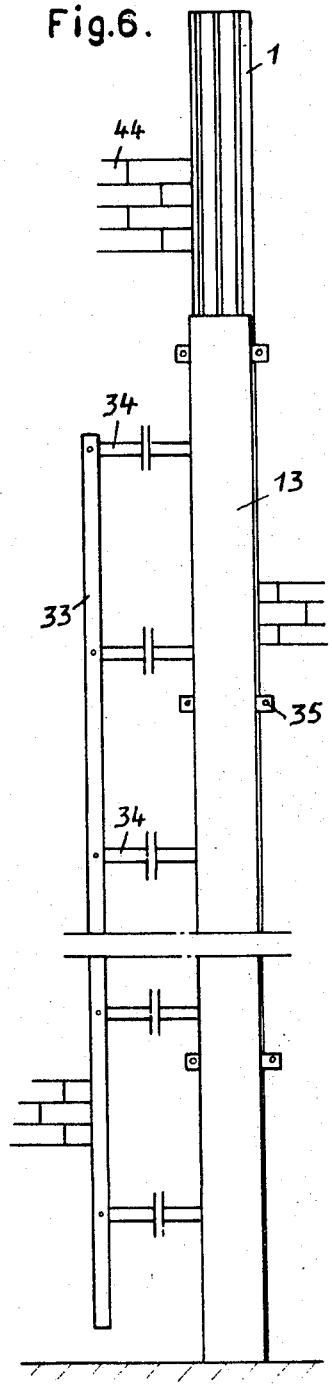

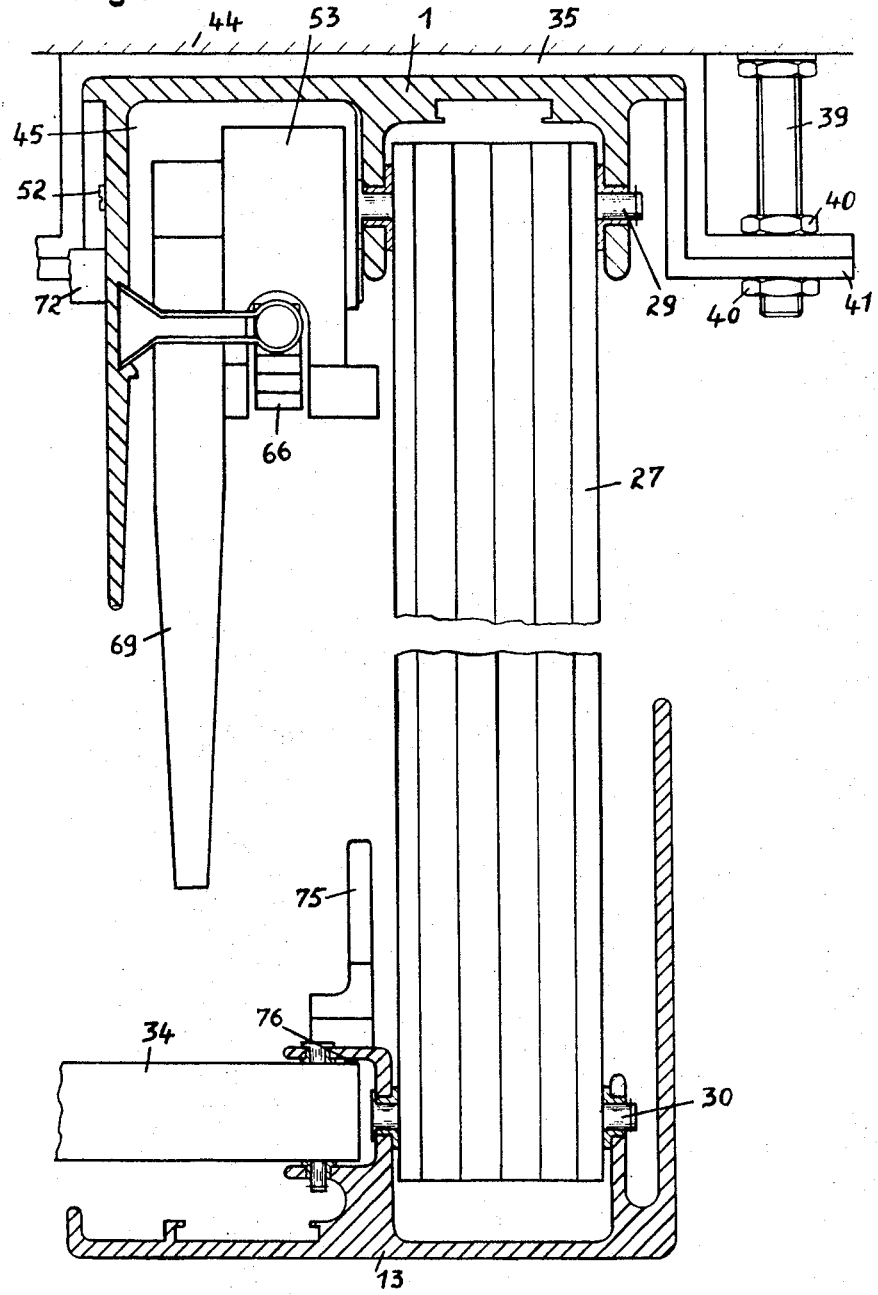

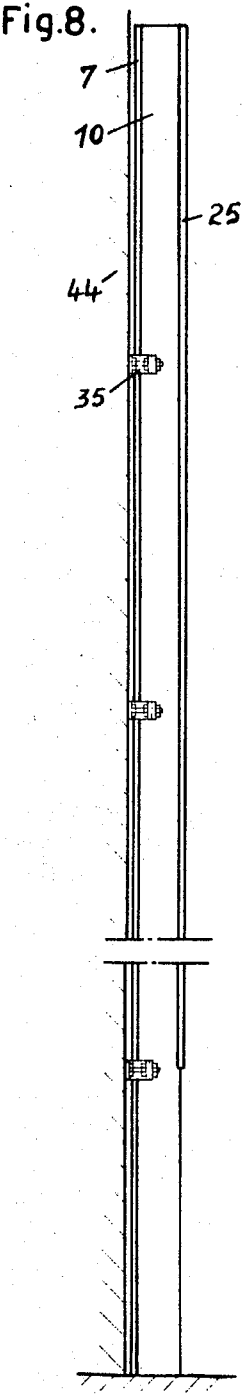
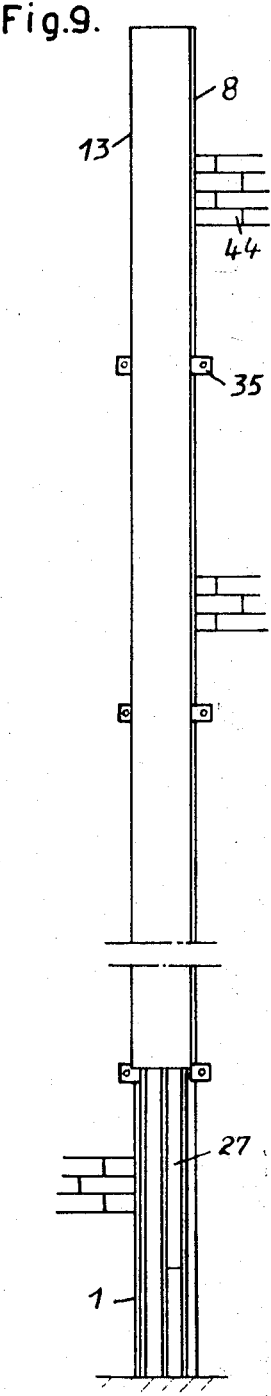

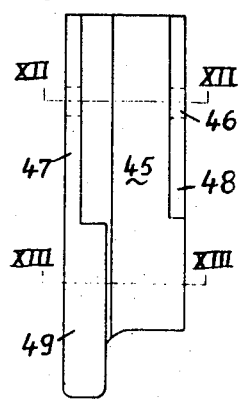
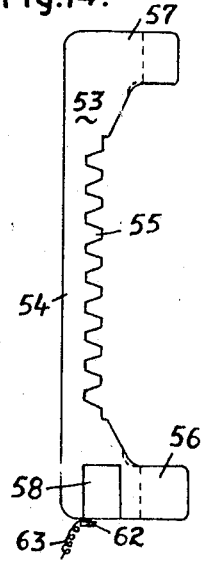
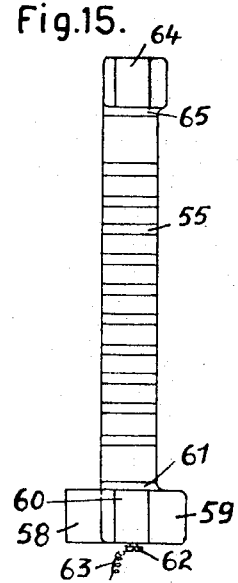
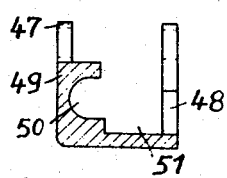
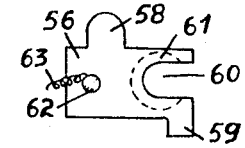
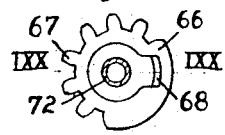
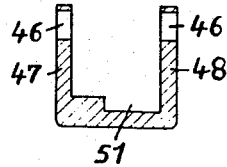
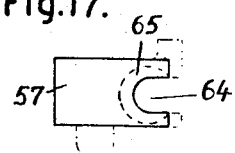
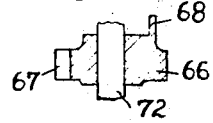
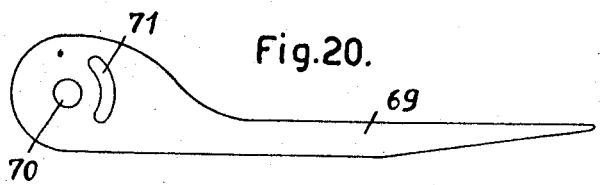
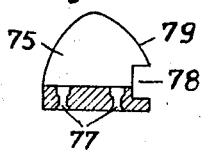
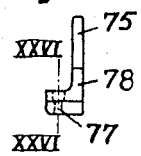

June 30, 1970    G. L. LOIX    3,517,770
FOLDABLE LADDER

Filed Dec. 16, 1968    7 Sheets-Sheet 7

United States Patent Office 3,517,770
Patented June 30, 1970

3,517,770
FOLDABLE LADDER
Gilbert L. Loix, 22 Chaussee Brunehaut,
Wihogne, Belgium
Filed Dec. 16, 1968, Ser. No. 783,919
Claims priority, application Belgium, Dec. 27, 1967,
41,581; June 28, 1968, 41,813
Int. Cl. E06c 9/08
U.S. Cl. 182—96
8 Claims

ABSTRACT OF THE DISCLOSURE

A ladder has two upright sections positioned one in front of the other and whose perpendicular sides within the plane of the ladder carry two longitudinal ribs with facing perforations receiving pivots for the pivotal mounting of the steps in order to fold by bringing together the uprights, and the ladder has the rail perpendicular to the plane of the ladder and constituted also by two uprights which can be brought near one another; there are also provided means for securing one of the uprights of the ladder on the support and means for maintaining the ladder in folded and unfolded position as well as audible and/or luminous signalling means actuated upon folding the ladder.

---

This invention is concerned with foldable ladders and in particular with escape ladders used in fires.

There are already known espace ladders which are permanently folded against the wall of a building and which are used in particular to evacuate the building in case of an emergency in particular in case of a fire.

Some such ladders have been previously disclosed in German Pats. 25,264, 33,201 and 42,014. If the devices thus proposed envisaged the essential of the conditions to be fulfilled by such ladders; pivoting of the rungs, fastening to a wall, unfolding means and alarm means, they have not however found widespread acceptance owing to various serious disadvantages. Thus there was suggested the use of elements made of iron or bronze which made the ladder extremely heavy and accordingly of difficult handling. Most of the materials used rusted with the serious consequences that the mechanical resistance decreases, the pivots become blocked and incidentally the appearance of the ladder and of the building becomes marred. The means provided for unhooking the movable upright and the rungs were either clutch and cables (German Pat. 25,264), or a rotating continuous rod externally disposed (German Pat. 33,201) or located inside the building (German Pat. 42,014) and acting upon the ladder by supplementary means such as pins, endless screws, chains, etc. Such assemblies are complicated.

In the German Pat. 33,201, it is provided that each actuating handle gives when rotating a push on the movable upright which brings the same outside its equilibrium position and triggers the unfolding of the ladder whose weight exceeds the retaining effect of opposed springs. If this operating principle is acceptable for a new ladder, it is evident that weathering renders such operation rapidly illusory.

The foldable invention of the present invention has none of the above mentioned drawbacks. It is practically entirely made of rust-proof materials of low density such as aluminium silicium alloys allowing the extrusion or the injection moulding of most of the constituent elements. The invention provides additionally a rail-forming ladder which is made in the same manner as the ladder itself and which unfolds perpendicularly to the plane of the ladder, thus parallel to the supporting wall, this in order to increase safety of use. In the case of a very long ladder, the movable upright is suspended at its head in order to avoid all danger of buckling.

Additionally, the ladder of the invention can when it is not provided with a rail be used as a removable and portable ladder used as conventional ladders by placing it against a support and the like. Its great advantage over the said conventional ladders is its small volume when folded for transport, storage or handling. It will be also made of light metal or possibly of synthetic material such as reinforced polyester.

These materials also have the important advantage of being practically rustproof which is particularly important in the case of ladders which are permanently secured on buildings and are therefore exposed to the elements. Naturally, the use of synthetic materials is not in the present state of the art to be considered for making escape ladders their resistance to heat being too small.

Essentially, the ladder according to the invention is constituted of two uprights of angle cross section, these two uprights being positioned one in front of the other in order to have their inner sides facing one another. Perpendicular to two of these inner facing sides, that is to say those of the flanges constituting the lateral sides of the ladder, are located two ribs each of which faces the corresponding rib of the other upright. Perforations located at regular intervals on the entire length of said ribs receive pivots for pivoting the rungs. These either have a U-shape or advantageously have a tubular square or rectangular cross section with perforations at the end for introducing pivots.

The optional rail is carried by the movable upright. For this purpose, the outer rib of the latter carries two flanges which are perpendicular thereto and outwardly directed, these are provided with perforations for receiving the pivots of the cross pieces which have the shape of a U and which are pivoted in similar fashion at their other end on the U-shape section constituting the outer upright of the rail.

The various described elements are sized and positioned in such a way that when the ladder is folded the uprights bear almost one upon the other thus forming a cross of substantially square cross section enclosing and protecting the rungs and the rail which are of course already folded.

In the embodiment consisting of an escape ladder applied vertically along the wall of a building, the ladder is secured for example by insertion in anchorage themselves bolted into a wall with means for adjusting them parallel and perpendicular to the said wall.

The ladder can also be provided with means for maintaining the same in folded and unfolded position as well as means, for example, springs, acting on each rung, braking its unfolding movement and assisting in closure thereof as well as increasing the rigidity of the assembly. It can also be provided with audible and/or luminous signalling devices, giving alarms in case of a fire or of abusive use.

In order to clarify the above given presentation, the accompanying drawings represent by way of nonlimiting example one embodiment and modifications of a ladder in accordance with the invention.

To this effect FIG. 1 is a cross sectional view of the fixed upright with its anchor.

FIG. 5 is a front view of the ladder in unfolded position attached on a supporting wall.

FIG. 6 shows in a plane perpendicular to that of FIG. 5 the ladder with its unfolded rail.

FIG. 7 is a cross sectional view of the unfolded ladder.

FIG. 8 shows the ladder folded and attached against a wall of support.

FIG. 9 is a view taken in a plane perpendicular to that of FIG. 8 of the folded ladder.

FIG. 11 is a plane view of the support of the device for holding and unfolding the ladder.

FIG. 12 is cross section taken along line XII–XII of FIG. 11.

FIG. 13 is a cross section taken along line XIII–XIII of FIG. 11.

FIG. 14 is an elevational view of the slider.

FIG. 15 is a plane view of the slider.

FIG. 16 is an underneath view of the slider.

FIG. 17 is a top view of the slider.

FIG. 18 is a lateral view of the pinion for driving the slider.

FIG. 19 is a cross section view along IXX–IXX of FIG. 18.

FIG. 20 is a lateral view of the pusher.

FIG. 25 is a front view of a hooking member integral with the movable upright.

FIG. 26 is a cross section taken along XXVI–XXVI of FIG. 26.

Figure 1:
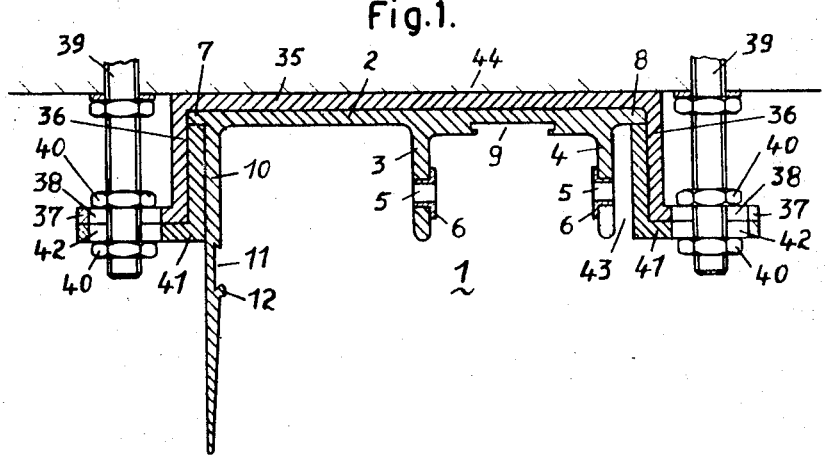
Figure 2:
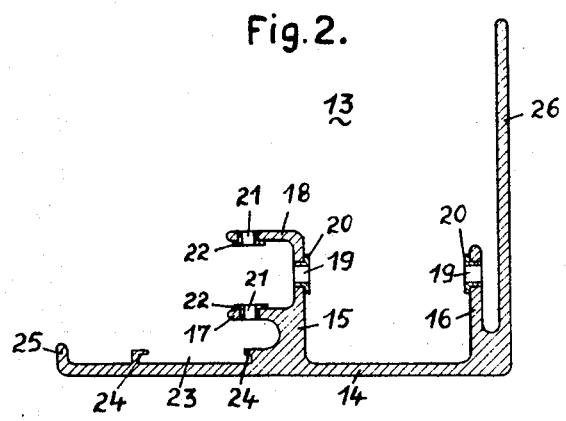
FIG. 2 is across section of the movable upright.
Figure 4:
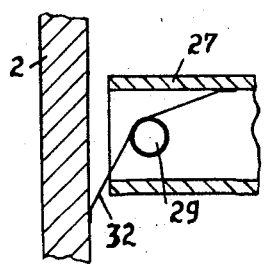
FIG. 4 shows the arrangement of a compensating spring.
Figure 3:
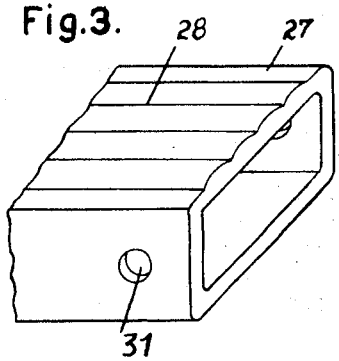
FIG. 3 is a perspective view on a rung having the shape of a rectangular truss.

Referring to the figures, fixed upright 1 has the general shape of an angle plate whose flange 2 intended to be applied against and held against the wall 44 or other support carries perpendicularly to its inner side two ribs 3, 4 located near its outer edge and extending into two flaps 7, 8. Between the two ribs, the flange is hollowed out by a groove 9, for example in the shape of a hammer head. The second flange 10 suitably of decreasing cross section in order to economize raw material, carries, near one third of its height, a groove 11, for example dovetailed, with, on one of its edges, a small biased raised area 12.

Figure 10:
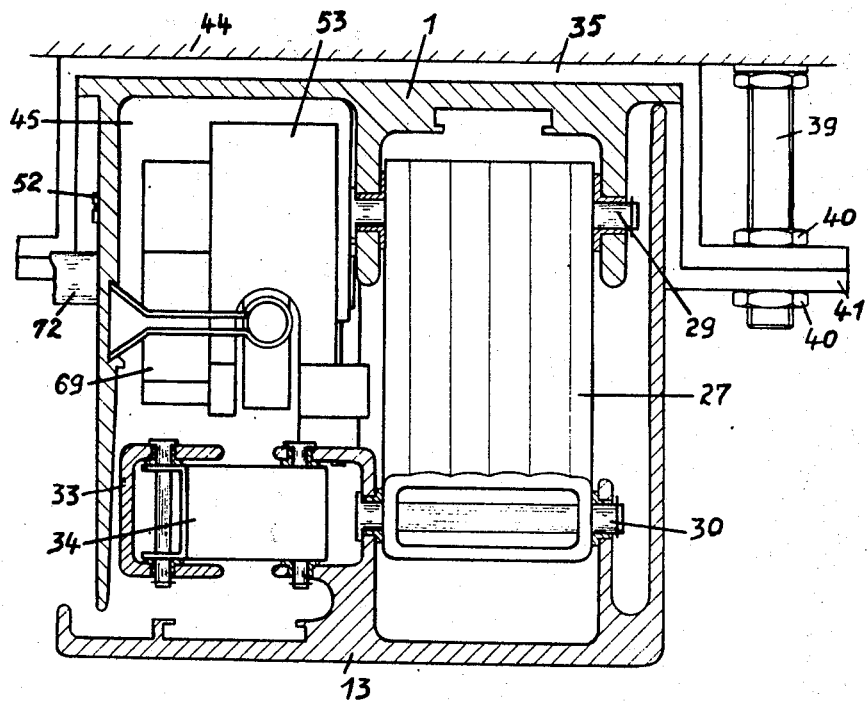
FIG. 10 is a cross sectional view of the folded ladder.
Figure 21:
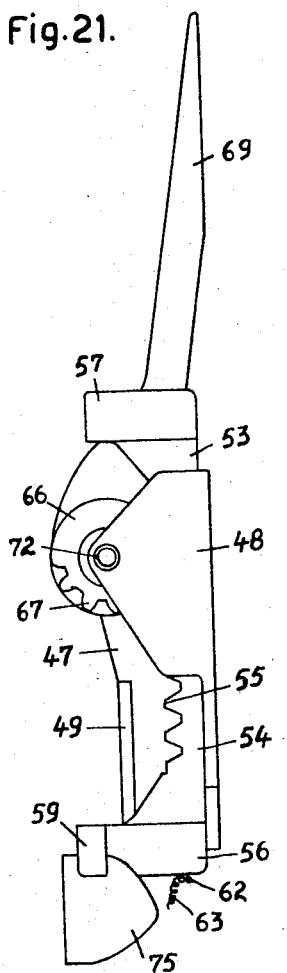
FIG. 21 is an elevational view of the assembled device.
Figure 22:
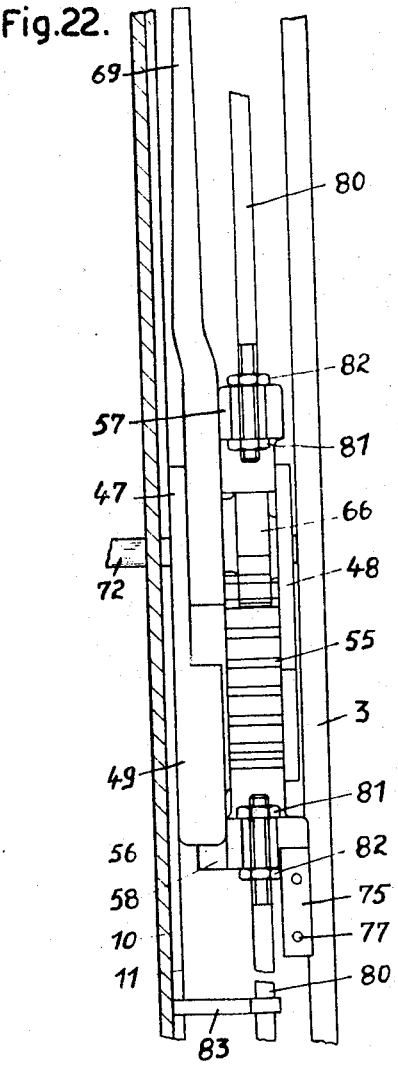
FIG. 22 is a front view of the assembled device positioned in the fixed upright.
Figure 23:
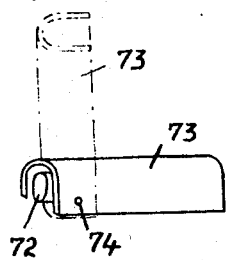
FIG. 23 is a modification of the handle for actuating the device.
Figure 24:
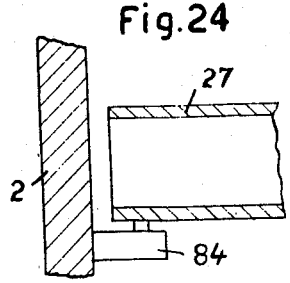
FIG. 24 shows the positioning of a button for actuating an alarm.

The second upright, hereafter denominated movable upright 13, also has the general appearance of an angle plate whose flanges 14 and 26 are respectively dimensioned with respect to flanges 2 and 10 of fixed upright 1 and this in order to ensure mutual interfitting when the ladder is folded (FIG. 10). The ladder being assembled, the uprights have their respective insides facing one another. Flange 14 has inside it two ribs 15, 16 located towards the corner of the upright in order to be respectively in front of ribs 3 and 4 of the fixed upright. It is provided with a groove 23, for example in the shape of a hammer head and formed by two legs 24. Its outer edge is advantageously folded into a tongue 25 intended to surmount for the sake of watertightness the edge of flange 10 of fixed upright 1 when the ladder is folded.

Additionally, a cap suitably may be used to cover the top of the ladder in order to prevent the effect of rain. This cap can be metallic or of synthetic material.

When the ladder has a rail, the rib 15 carries perpendicularly to its outside two small flanges 17, 18, this assembly forming the fixed upright of the rail while the movable upright is a U-shaped section 33 whose flanges are similarly spaced and are in front respectively of flanges 17 and 18 of the fixed upright.

The rungs 27 of the ladder are sections which are preferably rectangular. Their upper side advantageously has longitudinal striations 28 or are covered with a suitable anti-skid material.

The assembly of the ladder takes place in the following fashion: at regular intervals that is to say the spacing selected between the rungs, perforations 5 are longitudinally aligned in the ribs 3 and 4 and the perforations 19 in ribs 15 and 16. These perforations are positioned in such a way as to be located in groups of four in the same horizontal plane when the ladder is unfolded.

They are intended to engage with pivots 29, 30 maintained horizontally by clips, washers or other known means. These pivots are additionally engaged in perforations 31 correspondingly provided in the lateral sides of the rungs towards the extremities thereof. The rungs are thus secured and pivoted between the uprights.

On each pivot 29 and possibly also on each pivot 30 is slipped a compensating spring 32 whose rectilinear extremities bear respectively on the corresponding upright and on the rung.

Tubes 6, 20 of nylon or other similar non metallic material are advantageously engaged in perforations 5 and 19 and have a small collar which is applied against the inside of the corresponding rib. They avoid the apparition of an electrolytic couple between the metals constituting the sections and the pivots while the collars prevent possible contacts between the rungs and the ribs, contacts which can evenutally cause wear of said elements. Perforations 31 on the rungs advantageously receive similar tubes.

The rail is made the same as the ladder itself, small cross pieces 34 being knurled on pivots engaged in perforations 21 provided for this purpose in flanges 17 and 18 of rib 15 and corresponding perforations in the wings of section 33. All these perforations will also advantageously be provided with tubes 22 similar to tubes 6.

To secure the ladder to the wall or other support, the invention proposes an anchor 35 having the capacity to be adjusted horizontally parallel as well as perpendicular to the support which makes possible ready compensation of possible setting irregularities such as errors in the verticalness of the securing points. Cross sectionally, this piece is attached to a U-cross section whose flanges 36 extend each into an arm 37 folded at right angles towards the outside. Each of these arms is preforated with a transversal slot 38.

The fixed upright fits in piece 35 whose inside width is for this purpose slightly greater than the total width of the flange 2 of the said upright. The anchoring piece 35 is fixed on its support, for example a wall 44, by means of bolts 39 or the like, of any known system. These bolts are engaged in slits 38 which allow desired corrections to ensure the verticalness of the plane of the ladder. Additionally, the width of the said slits is slightly greater to the diameter of the bolts in such a way that small differences in alignment which are possible in the bolts in the horizontal direction can be compensated easily without danger of wedging between the anchoring piece and the fixed upright.

Each arm 37 is gripped between two nuts 40 whose position on bolts 39 allows to easily compensate possible unbalance or projection of the wall at the point of attachment.

Angle plates 41 also perforated with a slit 42 rest on each of flanges 36 and the corresponding arm 37, they have a size such as to bear against the arms 7 and 8 of upright 1 which is thus strongly held in the anchoring piece 35.

Between rib 4 and corner 41 corresponding is provided a space 43 for the insertion of the extremity of flange 26 upon folding of the ladder.

The assembly of the successive segments of the ladder result in the following dispositions: a positive connection of fixed uprights on the supporting wall itself, an indirect connection of the movable uprights by the rungs and the fixed uprights. Additionally, the aligning of the consecutive segments takes place by means of profiled chapes in order to fit in grooves 9 of the fixed uprights and 23 of the movable uprights, these pieces are maintained by screws or the like engaged in suitable perforations. It is also possible to use broaches engaged in perforations made in the thickness of the uprights. An additional connection through flanges 10 (possibly also through flanges 26) is provided by means of shaped pins which can become inserted by transversal elasticity in groove 11, the insertion being facilitated by the biased raised section 12. The successive elements of the rail can be assembled in similar fashion.

In the case of a very tall ladder, it is provided that the movable upright can when the ladder is unfolded be suspended at its head for example to a post attached to the building, the connection between the post and the upright taking place by any suitable means such as hooks or others.

From place to place along the ladder, principally on a level with each story of the building, the invention envisages the placing of means for maintaining the ladder in folded and unfolded position.

Each of these devices consists essentially of a support 45, a slider 53 with a ratchet 55 and nose 59, and a shaft 72 carrying an actuating handle 73, a driving pinion 66, an unfolding pusher 69, all these elements being mounted on the fixed upright and a hooking piece 75 integral with the movable upright. Additionally linking means ensure the simultaneous operation of all of the devices during actuation of any one control handle.

Support 45 is a substantially U-shaped piece of a size such as to permit its introduction between flange 10 and rib 3 of upright 1. Flanges 47, 48 carry two facing perforations 46 to receive shaft 72. Flange 47 carries on a part of its length a projection 49 hollowed by a longitudinal groove 50; the lower edge of the projection extends along the entire length of the support and forms with flange 48 and the core of the U-shaped a groove 51. Flange 48 and the core are cut back on a part of the length of the piece.

The support is secured at the desired height for the device by means of bolts 52 or the like engaged in perforations made during assembly in flange 10 of the upright and flange 47 of the support.

Slider 53 includes a base 54 engaged in the groove 51 of the support and whose upper side is shaped in the form of a ratchet 55. At its extremities, it carries raised zones 56 and 57. The raised zone 56 has on the one side thereof a rounded projection 58 sliding in groove 50 and on the same side or on the opposite side, a nose 59 adapted to cooperate with the hooking piece 75 of the movable upright. The upper part of the raised zone is hollowed by a round-bottomed groove 60, a hollow 61 being provided in one or in the two sides of the raised zone around the orifice of the groove 60. In the lower side of the raised zone is provided a tap perforation for the engagement of a screw 62 securing a return spring 63 whose other extremity hooks in similar fashion to a fastener integral with upright 1. Raised area 57 has a rectangular cross section, it is also hollowed out of a rounded-bottom groove 64 with, on one of its two side faces, a hollow 65.

Meshing with ratchet 55, driving pinion 66 is mounted on shaft 72 with which it is made integral by a wedge, pressure screw or other known means. Its teeth 67 are shaped on about two thirds of its periphery which suffices to cause the required longitudinal movement of the ratchet. On one of the sides of its non toothed part is located a stud 68. Also mounted on shaft 72 but without wedging in a rotary direction, pusher 69 is an elongated member with a head provided with perforation 70 for the passage of shaft 72 and a groove in an arc of circle 71 in which is engaged nut 68 of pinion 66, When the device is placed in upright 1, shaft 72 passes through a perforation made for this purpose in flange 10 at the same time as the perforations receive the bolts or securing screws of the support. Its extremity is arranged to receive an actuating handle. In an advantageous embodiment of the invention, this handle is a half circle shaped profile 73 which in operative position is folded to longitudinally surmount shaft 72. It is pivoted thereon by pivot 74 and to operate rises perpendicularly to said shaft 72.

A hooking piece 75 intended to cooperate with the nose 59 of the slider is secured also during assembly at a good height from the flange of the movable upright 13 by screw 76 or the like engaged in perforations 77 in the base of the hooking piece and in perforations drilled at that time in flange 18. The hooking piece has a nick 78 for engagement of nose 59, ramp 79 is intended to facilitate the movement of introduction of the nose in the nick.

The operation of the device will be understood then as follows: assuming the ladder folded, the movable upright is immobilized by engagement of nose 59 in nick 78. By turning shaft 72 with handle 73, the toothed pinion 66 drives upwardly slider 53 which frees nose 59 from nick 78. During this rotation of the pinion, stud 68 moves freely in groove 71. The movement continuing, the stud then drives pusher 69 which pivots and bearing against movable upright 13 forces it to move away from fixed upright 1; carried by its weight, the ladder then completes its unfolding movement which is besides braked by the action of the compensating springs 32. The rail easily unfolds either owing to its own weight or additionally by manual action.

When the operator lets go the handle, the return spring 63 which has been tensed during the upward movement of the slider withdraws the latter downwardly which causes pinion 66 and shaft 72 to turn, pusher 69 and handle 73 are brought back into vertical position and accordingly cannot interfere with the movement of persons round the ladder.

To bring the ladder back to folded position, it suffices to raise the movable upright, operation which is facilitated by the action of the compensating springs 32. At the end of the movement, nose 59 contacts ramp 79 which lifts its slightly in order to bring it to the edge of nick 78 into which it fits. The ladder is thus locked again in folded position. The rail will naturally also have been folded in similar fashion.

When the length of the ladder and local use requires several holding and unfolding means along its length, their simultaneous operation by the actuating of a single manoeuvring handle is achieved by linking means, for example tubes 80 whose extremities are engaged respectively in nick 64 of the slider of one device and nick 60 of the slider of the device immediately above. These extremities of the tubes are outwardly threaded in order to allow through nuts 81 and lock nuts 82 the correct lengthwise adjustment and the mounting with each slider. At least the nut or the lock nut of each end is partially engaged and held in the hollow 65 or 61 corresponding thereto, which immobilizes transversely the tube. The tubes are advantageously guided with possibility of sliding by spurs 83 positioned at suitable spacings on their length and secured on flange 10 by the elastic insertion of their supporting arm in groove 11.

In an advantageous embodiment, a continuous link slides in a groove made in the fixed upright, this linking part has in its turn a groove for the engagement of fastening bolts of the ratchet. In this manner the height adjustment of the said ratchet requires no drilling or adjustment of threaded linking rods.

To warn the occupants of a building in case the ladder is unfolded, either to rapidly sound an alarm in case of fire or to prevent all unauthorized use, the invention envisages the installation of an electric alarm for each story. This alarm (not shown) is preferably fed by an individual current source such as a battery or a small storage battery (also not shown). In its circuit is located a switch 84 of any known type secured on flange 2, for example below the corresponding maintenance device and whose head is placed, for example by the lower edge of a run 27, when the ladder starts its unfolding movement. The alarm is thus positively put into operation.

Most of the constituent elements of the ladder are advantageously made of rust-proof material, preferably of a stainless metal alloy. The pivots and the shafts are made of steel which has received a surface treatment against oxydation, the same is true for the screws, nuts and other small parts. With a view to an inexpensive construction, the sections, the uprights and the rungs are made by extrusion, the main elements of the maintenance device are of injected parts which only require slight machining, essentially a simple trimming.

The invention claims also the construction of a simplified ladder without rail or maintenance device. Essentially, it only comprises the two uprights and the rungs. As already indicated, its great advantage is its slight cumbersome mass when folded. It can have additional uprights pivoting at the head to form a step-ladder or also from a double ladder. To fulfill the requirements of protecting the backs of the users, such as required by various ordinances, the invention envisages an additional rail which can unfold parallel to the ladder to constitute therewith and with the wall and the rail a complete channel. This additional rail will also have two uprights with pivoted cross pieces, its movable upright being adapted to engage the movable upright of the first rail.

What is claimed is:

1. A foldable ladder comprising two oppositely facing uprights, rungs pivoted on said uprights, one of said uprights being stationary and the other movable in the plane of said rungs, means for fastening one of said uprights on a support, means for maintaining said ladder in folded and unfolded positions, the internal sides of said uprights, perpendicular to the plane of said ladder, each carrying a pair of longitudinal ribs facing the ribs of the other upright with longitudinal oppositely facing perforations at regular intervals on said uprights, and pivots in said perforations for securing said rungs, interfitting flanges on said uprights for enclosing the ladder when it is folded.

2. A ladder according to claim 1, further comprising a rail, a plurality of cross pieces and means pivotally connecting the extremities of said cross pieces between one of said uprights and said rail for permitting said rail and cross pieces to be pivoted against said one upright so that they are enclosed by said uprights when the ladder is folded.

3. Foldable ladder according to claim 2, wherein said rail consists of a second fixed upright formed by one of said ribs on said movable upright, said second fixed upright having two flanges perpendicular to said rib and outwardly directed, said cross pieces being pivoted on said flanges.

4. Foldable ladder according to claim 1, wherein said uprights comprise L-shaped members connected to said rungs to form a truss having a substantially squared cross section where said ladder is folded.

5. A foldable ladder according to claim 1, wherein one of said uprights is mounted to the inside of the bight of on elongated U-shaped anchor, said anchor having flanges connected to said bight and extending into arms having transverse openings for securing the anchor to a support.

6. Ladder according to claim 1, comprising several successive segments, said uprights having longitudinal grooves in their said internal sides, and shapes for fitting in said grooves for aligning and connecting said segments.

7. A foldable ladder comprising two oppositely facing uprights, rungs, pivot means connecting said rungs to said uprights, one of said uprights being fixed to a support and the other upright being movable, and means at regular intervals on said ladder for maintaining said ladder in folded and unfolded positions, means comprising a support connected to one of said uprights, ratchet means including a slider having thereon and having nose means a shaft carrying a handle for driving said ratchet and means, push button means for unfolding said ladder, said maintaining means being mounted on said stationary upright, and a hooking member mounted on said movable upright and cooperating with said nose of said ratchet means, said maintaining means being mutually connected for simultaneous operation by actuation of any one said handle.

8. A foldable ladder according to claim 7, having compensating springs wound around said pivot means for cooperation with said maintaining means for urging said ladder into a folded position.

References Cited
UNITED STATES PATENTS

| | | | |
|---|---|---|---|
| 378,316 | 2/1888 | Holt | 182—95 |
| 647,214 | 4/1900 | Billmeyer | 182—94 |
| 719,990 | 2/1903 | Bracklo | 182—160 |
| 1,140,281 | 5/1915 | Otto | 182—95 |
| 2,670,968 | 3/1954 | Duffy | 182—89 |
| 3,209,897 | 4/1962 | Moberg | 182—187 |

REINALDO P. MACHADO, Primary Examiner

U.S. Cl. X.R.

182—160